(12) United States Patent
Clarke et al.

(10) Patent No.: US 11,166,566 B2
(45) Date of Patent: Nov. 9, 2021

(54) SELF-ADHESIVE PATCH

(71) Applicants: Donna Evelyn Clarke, London (GB); Stephanos Andrea Pavlou, London (GB)

(72) Inventors: Donna Evelyn Clarke, London (GB); Stephanos Andrea Pavlou, London (GB)

( * ) Notice: Subject to any disclaimer, the term of this patent is extended or adjusted under 35 U.S.C. 154(b) by 315 days.

(21) Appl. No.: 15/769,843

(22) PCT Filed: Oct. 27, 2015

(86) PCT No.: PCT/GB2015/053213
§ 371 (c)(1),
(2) Date: Apr. 20, 2018

(87) PCT Pub. No.: WO2017/072472
PCT Pub. Date: May 4, 2017

(65) Prior Publication Data
US 2018/0317666 A1    Nov. 8, 2018

(51) Int. Cl.
| | | |
|---|---|---|
| *C09J 7/21* | (2018.01) |
| *C09J 7/38* | (2018.01) |
| *B29C 73/10* | (2006.01) |
| *A47C 31/00* | (2006.01) |
| *B29K 711/08* | (2006.01) |
| *B29L 31/44* | (2006.01) |

(52) U.S. Cl.
CPC .............. *A47C 31/00* (2013.01); *B29C 73/10* (2013.01); *C09J 7/21* (2018.01); *C09J 7/385* (2018.01); *B29K 2711/08* (2013.01); *B29L 2031/44* (2013.01); *C09J 2301/122* (2020.08); *C09J 2301/16* (2020.08); *C09J 2400/263* (2013.01)

(58) Field of Classification Search
None
See application file for complete search history.

(56) References Cited

FOREIGN PATENT DOCUMENTS

| | | |
|---|---|---|
| EP | 2 158 885 A1 | 3/2010 |
| WO | 2010/001113 A1 | 1/2010 |
| WO | 2015/031389 A2 | 3/2015 |

OTHER PUBLICATIONS

Tempels, Marco, International Search Report, European Patent Office, dated May 3, 2016.

*Primary Examiner* — Frank D Ducheneaux
(74) *Attorney, Agent, or Firm* — Florek & Endres PLLC

(57) ABSTRACT

A self-adhesive patch formed of leather, bonded leather or synthetic leather for application to furniture, garments and luggage is provided with a debossed peripheral region which is coplanar with the reverse side of the patch and denser than the remainder of the patch. When applied, the edge of the patch is therefore lower than the main body of the patch and less likely to be unpeeled from the item to which it is attached.

20 Claims, 5 Drawing Sheets

SELF-ADHESIVE PATCH

CROSS REFERENCE TO RELATED APPLICATIONS

The present application is filed under 35 U.S.C. § 371 as a national stage of International Application No. PCT/GB2015/053213 filed on Oct. 27, 2015.

BACKGROUND OF THE INVENTION

Field of the Invention

The present invention relates to self-adhesive patches and in particular to self-adhesive patches suitable for repairing leather furniture and the like.

Description of Related Art

Self-adhesive patches for repairing furniture upholstery, and methods of repairing furniture upholstery are disclosed in WO2010/001113 and are sold under the trade mark MASTAPLASTA (RTM). These patches are specifically designed to adhere strongly to furniture upholstery and remain attached despite the body heat of a person sitting upon the furniture. Nonetheless, they have found popularity outside use in patching furniture, also patching car interiors, bags and leather jackets, on occasion for aesthetic instead of repair purposes.

The patches described in WO2010/001113 are described as having embossed stitching detail slightly inboard of their peripheries and being tooled to have clean defined edges. It is at these edges that there is the greatest likelihood of the patches peeling off the furniture, or the like, to which they are attached. Whilst use of particular adhesives defined in WO2010/001113 reduces the chance of peeling, it is still a possibility and this invention seeks to reduce that possibility.

BRIEF SUMMARY OF THE INVENTION

According to the present invention, there is provided a self-adhesive patch comprising a display surface on the obverse side and an adhesive backing on the reverse side wherein the adhesive backing is adapted to bond to furniture upholstery and the like; characterised in that the patch comprises a peripheral region at the outer edge of the patch and a main body region inboard of the peripheral region (and including the centre of the patch), wherein the peripheral region is thinner than the main body region.

Having a thinner peripheral region reduces the chances of peeling (as the thinner region is less likely to catch on clothing or the like) and has the added advantage of creating an almost seamless attachment to the substrate, minimising visibility and creating a neat finish.

The self-adhesive patch may be adapted to bond to leather.

The self-adhesive patch may be a furniture patch.

The patch may consist of the peripheral region and the main body region.

The peripheral region may extend around the entire periphery of the main body region and may entirely be thinner than the main body region.

The peripheral region may be entirely thinner than the entirety of the main body region.

The main body region may be provided with debossed regions which are thinner than the remainder of the main body region.

The peripheral region may be thinner than the debossed regions of the main body region.

The peripheral region may have a thickness substantially equal to the thickness of the debossed regions.

The main body region may have a thickness of at least 1 mm, e.g. between 1.0 mm and 1.2 mm, preferably about 1.1 mm.

The peripheral region may have a thickness of less than 1 mm, e.g. between 0.5 mm and 1.0 mm, preferably about 0.7 mm.

The peripheral region may be denser than the main body region. A denser peripheral region is less likely to be damaged than a peripheral region that is thinner, but of the same density.

The denser peripheral region may be debossed (i.e. formed by debossing).

The peripheral region may be substantially coplanar with the main body region on the reverse side and in a different plane to the surface of the main body region on the obverse side. This arrangement creates a step between the peripheral region and the main body region, such that when attached, the main body region projects further outward from the object to which it is attached. Thus, the main body region is likely to deflect any article that might otherwise catch on the edge of the patch.

The peripheral region may have a width of between 1 mm and 200 mm, but preferably between 1 mm and 10 mm, more preferably between 2 mm and 5 mm, e.g. about 4 mm. This width is sufficiently large that the peripheral region is noticeably distinct from the main body region, but small enough that most objects that might otherwise catch on the edge will be deflected by the thicker main body region.

The patches may be circular and have a diameter of between 50 mm and 150 mm, e.g. between 70 and 100 mm, such as about 80 mm The patches may be rectangular and have a width of between 30 mm and 100 mm and a length of between 50 mm and 150 mm, e.g. about 60 mm×100 mm.

The area of the peripheral region may be from 5 $cm^2$ to 15 $cm^2$, such as between 7 $cm^2$ and 10 $cm^2$, e.g. about 8 $cm^2$.

The patch may be for repairing a region of furniture upholstery, wherein the region of the furniture upholstery comprises a defect and the patch can be applied to the region to conceal the defect. The furniture patch is particularly well-suited for use by heavily trafficked establishments, such as restaurants, pubs and bars, which are less likely to incur the expense and delay in re-upholstery, particularly when subsequent damage is likely. The furniture patch can be used where restoration of the furniture to its original aesthetic condition is not required, in other words where concealment of the defect in the upholstery would suffice.

The defect may comprise a discontinuity in the upholstery. The defect would typically be a hole, cut or burn that would otherwise require expensive and time-consuming re-upholstery. Thus, the defects can be more easily dealt with.

The defect may comprise a stain. Rather than trying to remove the stain, it could be concealed. The adhesive backing may comprise a pressure-sensitive adhesive. The user can press the patch onto the upholstery for adhesion, rather than having, for example, to heat it.

The adhesive may comprise a high-strength acrylic adhesive. These adhesives have proven to particularly suitable for use in furniture patches. Preferably, the adhesive has an adhesion to steel of at least around 66N/100 mm. The adhesion to steel may be between around 66N/100 mm and 120N/100 mm.

The adhesive may have a temperature resistance of at least 37° C. This makes the patch particularly suitable for use with furniture because the patch will remain adhered to the furniture when subjected to normal body heat temperatures. Preferably, the temperature resistance is up to 82° C. for long periods. The temperature resistance may be up to 121° C. for shorter periods.

The adhesive backing may comprise 3M™ adhesive 300. This adhesive has been proven to be particularly effective for use in the furniture patch. The adhesive backing may be formed from 3M™ adhesive tape 927, 950 or 950EK or 95623-M tape. These tapes have been proven to provide a particularly good bond to the furniture.

The adhesive backing may extend to the outer periphery of the reverse side of the patch. The outer edge or periphery can be bonded well to the upholstery, which can make it less likely to peel away from the upholstery during use.

The adhesive backing may cover the entire reverse side of the patch. This provides a uniform bonding surface across the back of the patch and can increase overall bonding strength to the upholstery. If the patch is being applied to a region containing a defect, the adhesive can overlie the defect, even if it is a discontinuity such as a hole.

A release paper may overlie the adhesive backing. Thus, the adhesive backing can be uncovered just prior to adhesion to the upholstery to avoid causing degradation or loss of adhesive during transport and to maintain high bonding strength.

The patch may be adherable to an external surface of the upholstery. This can facilitate the process of applying the patch, since it does not need to be adhered to an inner surface of the upholstery.

The patch may comprise natural leather. A natural leather patch may be desirable for use with leather upholstery and may be seen to be a higher-end product.

The patch may comprise bonded or synthetic leather. This can be relatively inexpensive to manufacture. The synthetic leather may comprise a polycarbonate resin substrate and a polyurethane covering.

The display surface comprises a substrate, a substrate coating and a backing. The backing may comprise polyester, cotton or a blend thereof.

The display surface may visually contrast with the furniture upholstery adjacent the region. Rather than trying to match the patch with the upholstery, the patch would be a feature or focal point of the furniture.

The display surface may include a decorative pattern. The patch would be more visually appealing or unique and/or may receive advertising. The upholstery may be leather. Leather upholstery can be expensive to repair so the patch may be particularly cost-effective.

The patch may be pre-cut so that the area of the display surface is between 3 cm$^2$ and 400 cm$^2$ or between 27 cm$^2$ and 200 cm$^2$. The user does not need to cut the patch to size since the pre-cut size should be sufficient for most standard repairs or concealments.

According to a second aspect of the invention, there is provided a method of forming a patch according to the first aspect of the invention comprising laminating an adhesive backing to a fabric, debossing the fabric, and cutting the fabric to form a patch having a debossed peripheral region.

A length of fabric may be laminated with a double sided adhesive tape under tension to provide the adhesive backing.

The fabric may be debossed at a temperature of between 100 degrees C. and 220 degrees C. This temperature achieves a good quality of debossing unlikely to damage/discolour inks or melt most suitable adhesives.

The weight applied during debossing may be in the region of 1-2 tons. The pressure applied is preferably at least 500 psi, more preferably at least 1000 psi, and a weight as mentioned can provide a suitable pressure of between 1000 psi and 4000 psi.

The debossing may be conducted for a dwell time of 1-5 seconds. This timeframe, like the temperature range, achieves suitable results without damaging the adhesive.

The method may comprise debossing using a heated die (e.g. one formed of heat-conducting metal), which may be heated to between 100 degrees C. and 220 degrees C.

The method may comprise providing a buffer, e.g. a nylon buffer in or adjacent to the die, the buffer defining the thickness of the peripheral region of the patch by defining the distance between the die and a ram that presses the fabric against the die.

According to a third aspect of the invention, there is provided upholstered furniture, luggage or clothing garment having bonded thereto a patch according to the first aspect of the invention or manufactured according to the second aspect of the invention. The patch of the third aspect may include any of the optional/preferred features of the first or second aspects.

Where the item to which the patch is adhered is furniture, it may be a seat such as a sofa, bar stool or vehicle seat. Alternatively, the garment may be a leather jacket or the luggage may be a handbag.

According to a fourth aspect of the invention, there is provided a method of applying a patch according to the first aspect of the invention to an item comprising: providing a patch according to the first aspect of the invention having a display surface on the obverse side and an adhesive backing adapted to bond to the furniture upholstery and the like on the reverse side; and adhering the patch to the item to conceal a region of the item.

The item may be upholstered furniture and the patch may be adhered to the upholstery (e.g. leather upholstery). Alternatively, the item may be the leather trim of a vehicle, a garment, such as a leather jacket, or an item of luggage, such as a handbag.

The adhesive backing may comprise a pressure-sensitive adhesive and the method may comprise pressing the patch onto the item to conceal a defect in the region. This simplifies application of the patch.

BRIEF DESCRIPTION OF THE DRAWINGS

In order that the invention may be more clearly understood an embodiments thereof will now be described, by way of example only, with reference to the accompanying drawings, of which.

DETAILED DESCRIPTION OF THE PREFERRED EMBODIMENT

Figure 1:
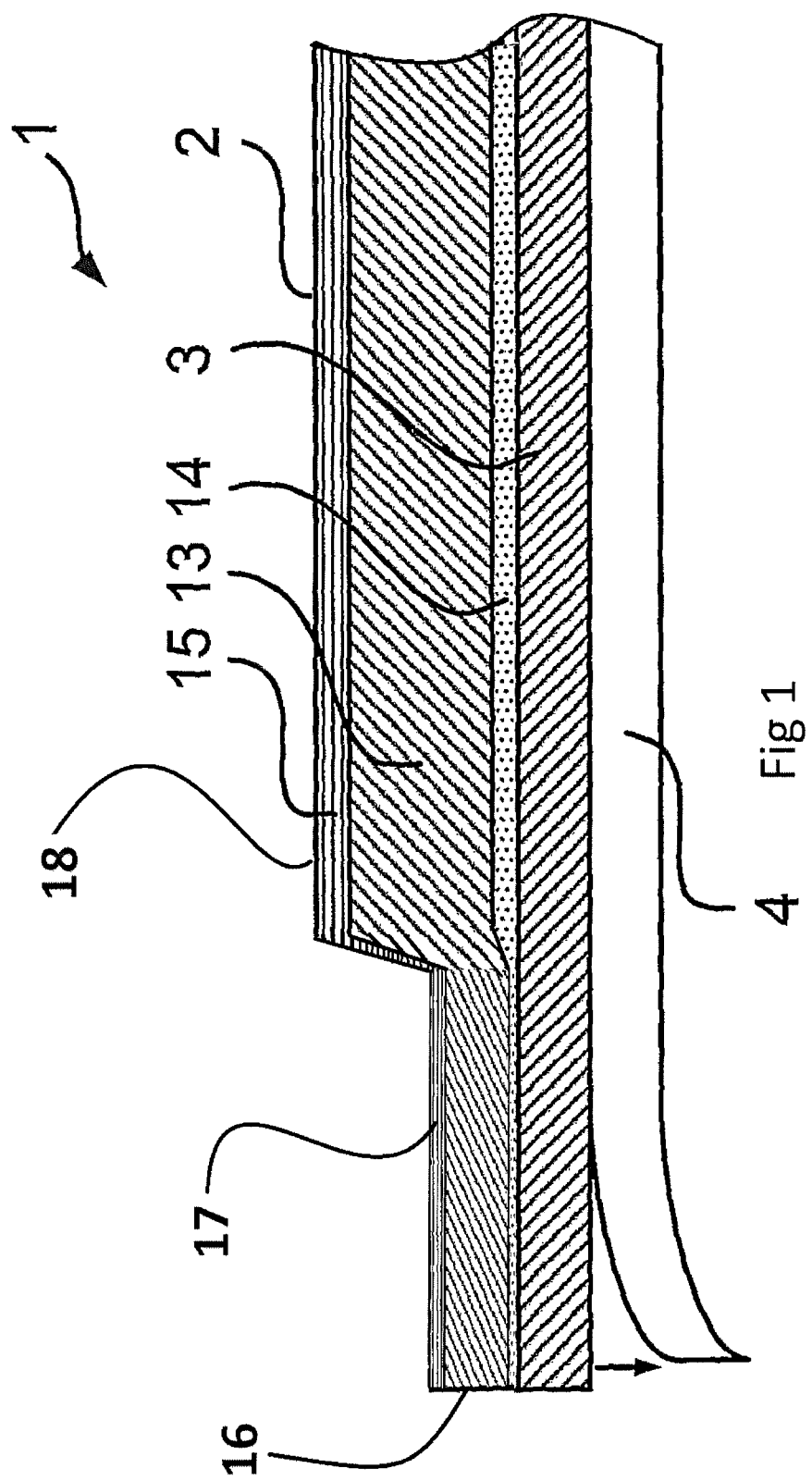
FIG. 1 shows a vertical cross section through part of a self-adhesive patch.

Referring to FIG. 1, a self-adhesive patch 1 has a display surface 2 on its upper or obverse face or side and an adhesive backing 3 in the form of an adhesive layer or an adhesive tape on its lower or reverse face or side. A peelable release paper 4 is provided on the adhesive backing 3.

The patch 1 is typically made of synthetic (sometimes referred to as 'artificial') leather, which is particularly cost-effective and has good absorbent properties. The patch 1 could, alternatively or additionally, be made of natural or bonded (sometimes referred to as 'reconstituted') leather or another material, whether synthetic or natural, which conforms to the fire regulations for the upholstery and/or automotive industry. If the leather, particularly synthetic leather, is artificially coloured, it can be thoroughly dyed to avoid any unsightly edging. The adhesive backing 3 is a pressure-sensitive adhesive which also conforms to the fire regulations for the upholstery and/or automotive industry. The adhesive backing 3 has strong and durable properties and can bond with various materials, such as leather upholstery. The adhesive backing 3 preferably extends to the outer periphery of the underside of the patch 1, and more preferably entirely covers the underside of the patch 1. This improves edge-to-edge adhesion to the upholstery.

In use, the release paper 4 is peeled away from the adhesive backing 3 and the patch 1 is pressed onto a region of upholstery to conceal part of the upholstery. The region being concealed typically surrounds a defect, but there may be another reason to conceal it such as for aesthetic improvement. The region to which the patch is to be applied may be cleaned prior to application of the patch 1 to improve adhesion.

There are various adhesives and adhesive tapes that can be used for the adhesive backing 3 of the patch.

The applicant has found that, in general, pressure-sensitive high-strength acrylic adhesives are very effective for use in the patch 1. The following have proven to provide particularly good bonding to leather furniture: Adhesive Transfer Tapes 927, 950 and 950EK, which are available from 3M™, whose corporate headquarters are at 3M Corporate Headquarters, 3M Center, St. Paul, Minn. 55144-1000, USA, and a double-sided tape with product number 95623-M, which is available from DOFF Limited of Bromsgrove, UK.

In more detail, the 3M™ Adhesive Transfer Tapes with 3M™ Adhesive 300 offer adhesion to a wide variety of surfaces, including many plastics. This pressure-sensitive medium firm acrylic adhesive family features a very high initial adhesion and good shear holding power.

All of the tapes 927, 950 and 950EK use 3M™'s Adhesive 300, are clear in colour and none of them has an adhesive carrier. Tapes 927 and 950 have a tan-coloured paper release layer or liner 4, whereas Tape 950EK uses a white extensible Kraft paper. The approximate thicknesses of these tapes without the release liner 4 are: Tape 927 0.05 mm (0.002 in), Tape 950 0.13 mm (0.005 in) and Tape 950EK 0.13 mm (0.005 in). With the release liner, the respective thicknesses are: Tape 927 0.10 mm (0.004 in), Tape 950 0.10 mm (0.004 in) and Tape 950EK 0.15 mm (0.006 in).

In terms of their physical properties, the respective Adhesion to Steel values (using ASTM test methods) are: Tape 927 66N/100 mm (60 oz/in), Tape 950 82N/100 mm (75 oz/in) and Tape 950EK 82N/100 mm (75 oz/in). The ideal working temperatures for these tapes is 21° C. to 38° C. (70° F. to 100° F.). This makes them suitable for use on furniture which will usually be at room temperature, but often raised to body heat temperatures when sat upon, which are usually around 37° C. (99° F.). However, their high-temperature operating range for long periods (days or weeks) is up to 82° C. (180° F.) for each of the tapes. Their high-temperature operating range for shorter periods (minutes or hours) is up to 121° C. (250° F.).

The 95623-M tape from DOFF Limited of Bromsgrove, UK includes a solvent-free modified acrylic adhesive. It has an Adhesion to Steel (AFERA 4001) value of 30N/25 mm. Its temperature resistance is −40° C. (−40° F.) to 95° C. (203° F.) for long periods and up to 120° C. (248° F.) for shorter periods. The total thickness of the tape, without a release paper, is 0.23 mm (0.009 in).

The combination of good adhesion and relatively high operating temperatures make these double-sided adhesive tapes which employ a pressure-sensitive high-strength acrylic adhesive particularly suitable for use in the patch 1.

The synthetic leather comprises a substrate 13, a backing 14 and a coating 15 for the substrate. The AXIOM Plus and Soft Touch synthetic leathers have proven to be particularly suitable for use in the patch 1. They are both available from Awesome Fabrics of The Stables, Unit 12, The Stables, Grange Farm, Green End, Great Stukeley, Huntingdon, Cambridgeshire, PE28 4AE or Abbey Fabrics of Unit 26, Earith Business Park, Meadow Drive, Earith Cambridgeshire PE28 3QF. In both cases, the substrate 13 is a polycarbonate resin, the backing 14 with polyester/cotton backing and the coating 15 is polyurethane. Vinyl-coated fabrics and other fabrics are also suitable.

The patch 1 is provided with a debossed peripheral region 17, extending inwardly from the outer edge 16. As a consequence of the debossing, the peripheral region 17 is substantially thinner (in the "vertical" direction assuming the patch 1 is placed with its adhesive backing 3 downwards) than the main body region 18 of the patch.

The debossing also causes the peripheral region 17 to be denser than the main body region 18 of the patch, as the same original thickness of material is condensed into a smaller volume. Owing to its density, the peripheral region 17 is less likely to be damaged than a thinner peripheral region 17 of the same density.

Figure 2C:
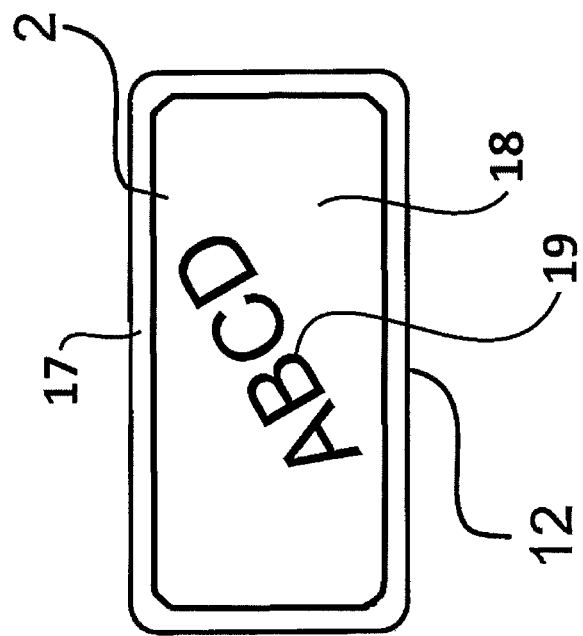
FIGS. 2*a-c* show plan views of three differently shaped patches as shown in FIG. 1.
Figure 2B:
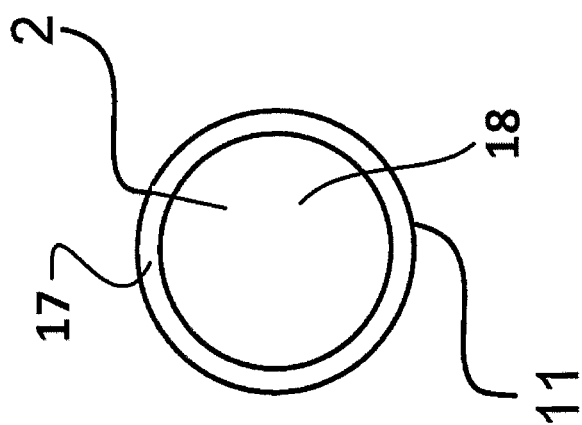
Figure 2A:
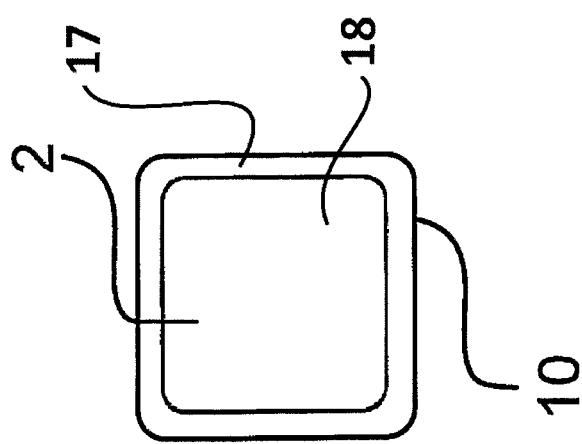

FIGS. 2a to 2c show a square patch 10, a circular patch 11 and a rectangular patch 12 all having the same features and cross section described in relation to the patch 1 of FIG. 1. The square patch 10 has a plain display surface 2, rounded corners and is around 7 cm×7 cm in size. The circular patch 11 is between around 8 cm and 14 cm in diameter and its display surface 2 is plain once again. The rectangular patch 12 is between around 9 cm×3 cm and around 20 cm×10 cm. The rectangular patch 12 has rounded corners and its display surface 2 has debossed regions 19 also inboard of its peripheral region 17. Overall patch surface areas from around 3 cm² to 400 cm² are suitable for the patch 1.

It can be seen that in each patch 10, 11, 12 the peripheral region 17 extends around the entire periphery of the main body region 18 and in is entirely be thinner than the main body region 18.

In relation to the square and circular patches 10, 11, the peripheral region 17 is entirely thinner than the entirety of the main body region 18.

By contrast, the main body region 18 of the rectangular patch 12 is provided with debossed regions 19 which are thinner than the remainder of the main body region 18, having a thickness substantially equal to the thickness of the peripheral region 17.

In these embodiments, the main body region 18 has a thickness of 1.1 mm, and the peripheral region 17 has a thickness of 0.7 mm. Consequently, the main body region protrudes 0.4 mm further out from the item to which the patch 1, 10, 11, 12 is attached. This creates a neater look and reduces the chances of the edge being caught and peeled away.

Figure 4:
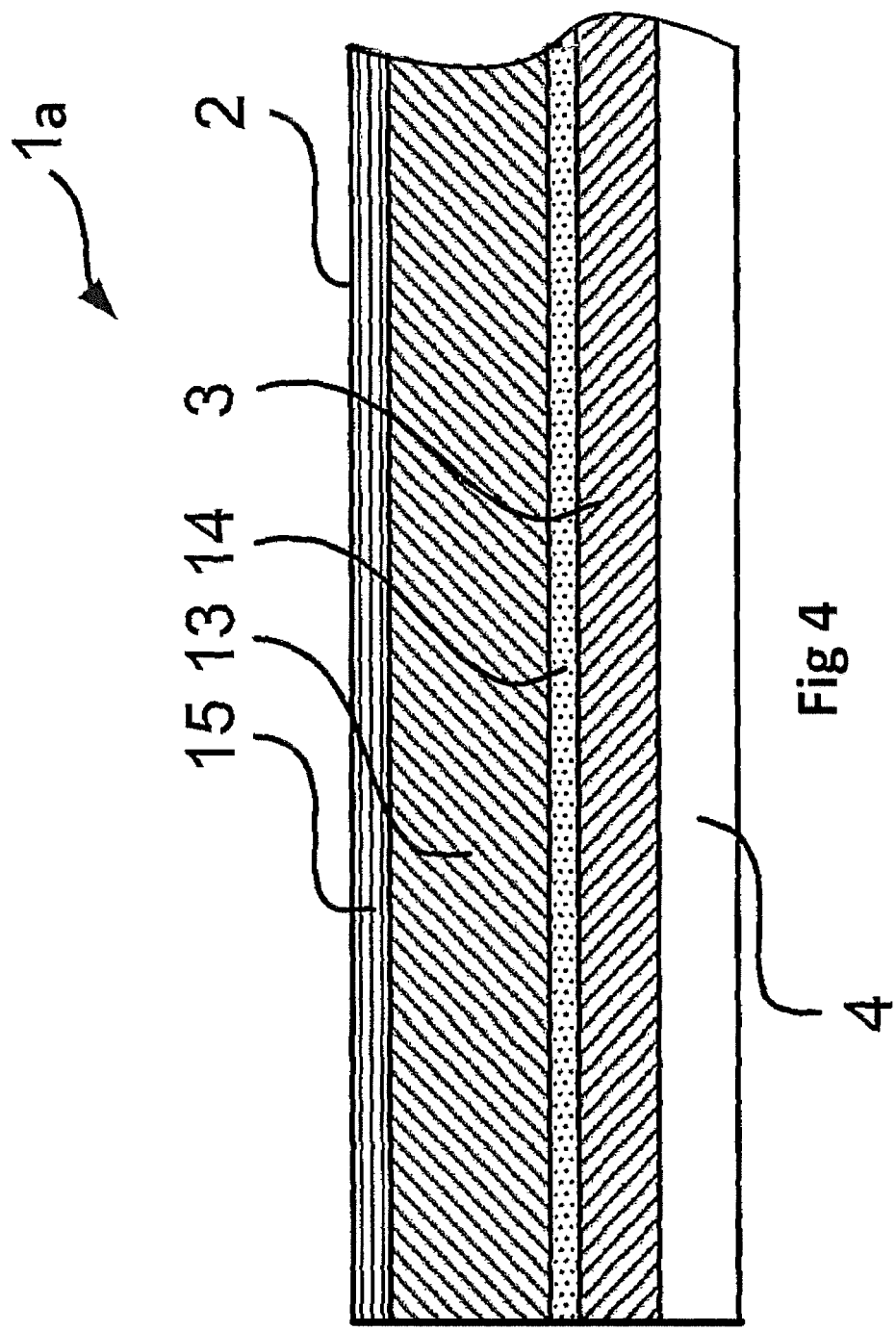
FIG. 4 shows a partial cross section through a part-formed self-adhesive patch according to FIG. 1.
Figure 5:
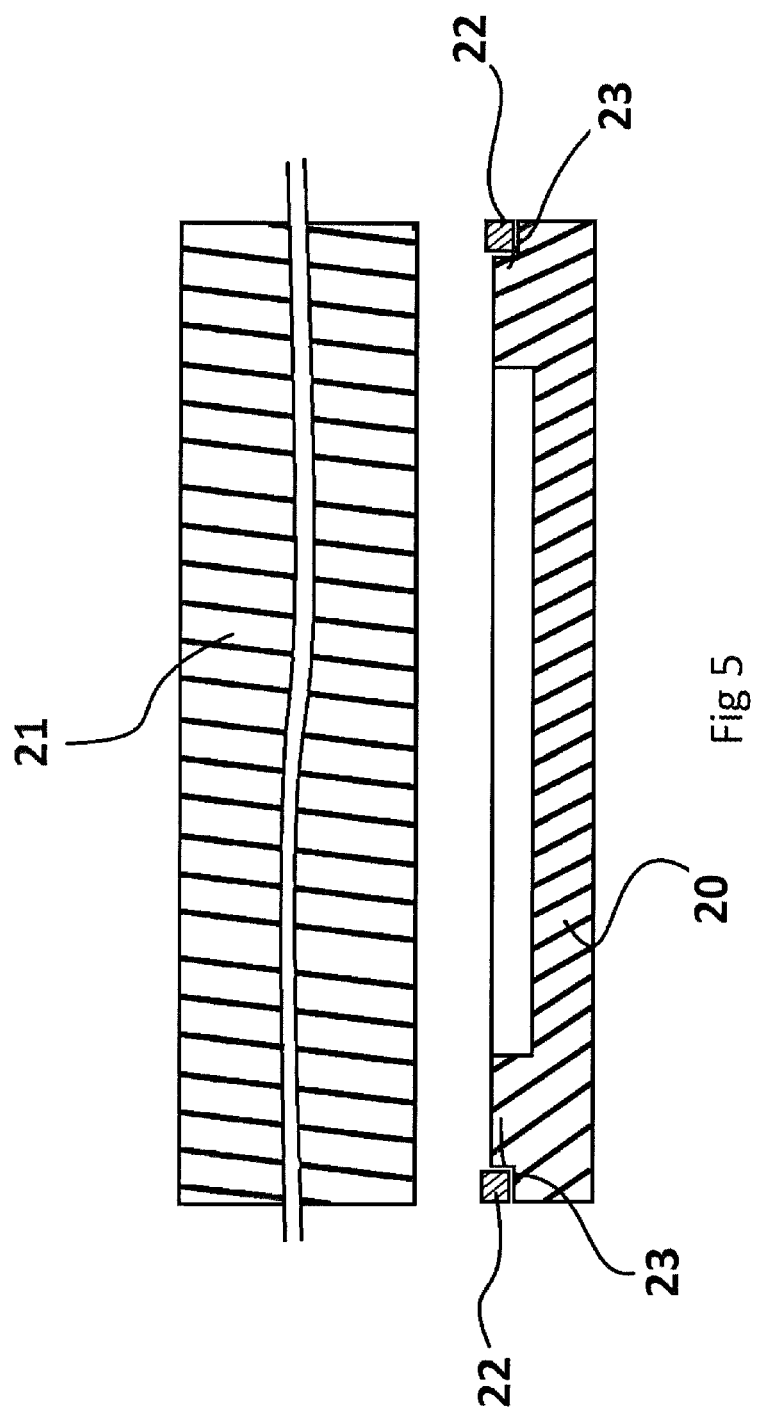
FIG. 5 shows a lateral cross section through a debossing apparatus for forming the self-adhesive patch of FIG. 1.

FIG. 5 shows the apparatus used to deboss the edges of the patches 1, 10, 11. As can be seen, the apparatus comprises a die 20, upon which part-finished patches 1a (shown in FIG. 4) are placed. The die 20 is provided with an upstanding rim 23, and a ram 21 is arranged to press down on the die 20. A replaceable spacer/buffer 22 (in this case formed of nylon), is arranged outside the rim 23 to space the die 20 from the ram 21, and thereby define the distance by which the rim 23 and the ram 21 are separated.

To form the patch 1, 10, 11, the adhesive backing 3 (and release paper 4) is first laminated to the backing 14 of the fabric (e.g. synthetic leather that will make up the patch 1). This forms a length of part-formed patches 1a shown in FIG. 4. The length of part-formed patches 1a is then placed on the die 20 with the display surface 2 facing downwards and the release paper 4 facing the ram 21. The die 20 is heated to between 120° C. and 200° C., and the ram 20 is lowered towards the die 20 so as to squeeze, and hence deboss, the portion of the patch between the rim 23 and the ram 21 at a force on the outside of the patch 1a of around 1-2 tons, creating an applied pressure for a large patch size of 1185 psi and for a small patch size of 3556 psi.

The buffer/spacer 22 holds the rim 23 a predetermined distance from the ram 21 to determine the thickness of the debossed peripheral region 17 and the ram 21 is held in place for 1-5 seconds (to avoid melting the adhesive). The inside diameter of the rim 23, is, of course, sized to match the size of the main body region 18 of the patch 1, and no force is applied in this recessed region. The outer diameter of the rim 23, on the other hand, is designed to be larger than the outer diameter of the peripheral region 17. Accordingly, the part-formed patch is debossed beyond the peripheral region 17.

This, in effect, creates a "bleed" area, of pressed fabric beyond what will become the outer edge 16 of the patch 1.

The part-formed debossed patch 1a, is then cut, using a cutting tool which cuts through the debossed "bleed" area to form a sharp outside edge 16, having a uniform distance from the main body region 18, such that the width of the debossed peripheral region 17 is constant. A typical width is about 4 mm. This is sufficiently large that the peripheral region 17 is noticeably distinct from the main body region 18, but small enough that most objects that might otherwise catch on the edge will be deflected by the thicker main body region 18.

To form the patches 1 with debossed regions 19 in the main body region 18, such as the rectangular patch 12 shown in FIG. 2c, a modified die would be used, having projections inward of the rim 23 to form a debossed shape 19 in the patch 12.

By pressing the display surface 2 downwards against the rim 23, the peripheral region 17 becomes coplanar with the main body region 18 on the reverse side (with the adhesive backing 3 remaining in the same position). However, the peripheral region 17 is in a different plane to the display surface 2 of the main body region 18 on the obverse side; the main body portion extending further from the coplanar reverse side. Thus there is a step between the peripheral region 17 and the main body region 18, such that when attached, the main body region 18 projects further outward from the object to which it is attached so as to deflect any article that might otherwise catch on the edge of the patch 1.

The patches 10, 11, 12 can be provided in various colours, such as ivory, red, dark brown, tan and black. The main body regions 18 of the display surfaces 2 of the patches 10, 11, 12 can be plain or can include a patterned design, which may be applied by dyes, inks, laser or embossing/debossing.

Figure 3:
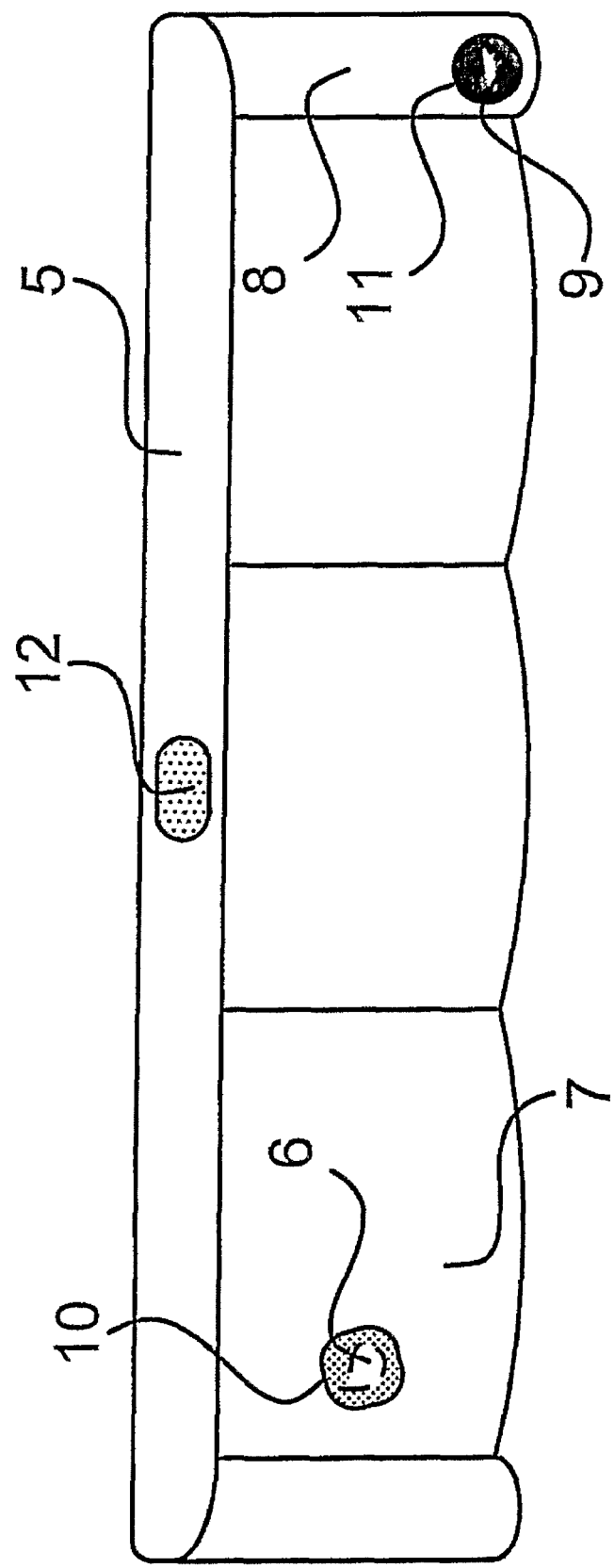
FIG. 3 shows a plan view of a sofa with the patches of FIG. 2 applied thereto.

FIG. 3 shows square patch 10, circular patch 11 and rectangular patch 12 applied to a damaged sofa 5. The square patch 10 is applied to conceal a hole or rip 6 in one of the sofa's cushions 7. The circular patch 11 is applied to one of the sofa's arms 8 which has been damaged by a cigarette burn 9. The patches 10, 11 when so applied conceal the defects, i.e. the hole 6 and burn 9, in the sofa 5. The rectangular patch 12 is applied to the top of the central backrest of the sofa for aesthetic purposes, i.e. decoration.

Rather than the patches 10, 11, 12 visually matching the appearance of the sofa 5 adjacent the defects 6, 9 or backrest area, the patches 10, 11, 12 can instead visually contrast with the sofa 5 to draw attention to the region to which they are applied. For example, a red synthetic leather circular patch having an unusual decorative pattern could be applied to a white leather sofa in a student bar as a focal point or unusual feature. Instead of the defect in the sofa 5 being caused by the furniture owner, the defect could be a natural imperfection in the upholstery only noticed after manufacture, damage caused while the sofa 5 is on display or may result from unavoidable degradation, in colour or texture after prolonged use.

Although the patches 1, 10, 11, 12 have been described in relation to a sofa 5, they are equally suited for application to other items of furniture including, but not being limited to, seating on or in: public transport (buses, trains, planes, boats and the like), private vehicles (cars, motorbikes, boats and the like), commercial establishments (bars, pubs, restaurants, cinemas and the like) and domestic establishments (homes, caravans and the like).

Although the present invention has been described with reference to the example above, various modifications will be apparent to those skilled in the art. For example, although the patches 1, 10, 11, 12 have been described as having particular shapes, sizes and colours, it will be appreciated that the particular appearance of the patch 1, 10, 11, 12 can be varied within the scope of the appended claims. Furthermore, although the upholstery and patches 1, 10, 11, 12 have generally been described as being leather (including synthetic leather), they could be another suitable material such as the upholstery fabric found on public transport seats, where any spare fabric could be used to form the patches.

Furthermore, although the patches 1, 10, 11, 12 have been described as being adherable to furniture upholstery to conceal a region of the furniture upholstery, they could also be used to conceal a region of other articles comprising a flexible material layer, such as a synthetic or hide covering. Such articles include garments, for example leather jackets, trousers and the like, and fashion accessories, such as suitcases, handbags, gloves and the like.

The above embodiments are described by way of example only. Many variations are possible without departing from the scope of the invention as defined in the appended claims.

The invention claimed is:

1. A self-adhesive patch formed at least in part of a material taken from the group consisting of a natural leather, a bonded leather, a synthetic leather, a fabric, and combinations thereof, the patch comprising a display surface on an obverse side, an adhesive backing on a reverse side, a peripheral region from an outermost edge of the patch to a main body region inboard of the peripheral region, wherein the entire peripheral region is thinner than a thickest portion of the main body region.

2. A self-adhesive patch according to claim 1 wherein the main body region has a thickness of between 1.0 mm and 1.2 mm and wherein the peripheral region has a thickness of between 0.5 mm and 1.0 mm.

3. A self-adhesive patch according to claim 1 wherein the peripheral region is denser than the main body region and is debossed.

4. A self-adhesive patch according to claim 1 wherein the peripheral region is substantially coplanar with the main body region on the reverse side and in a different plane to the surface of the main body region on the obverse side.

5. A self-adhesive patch according to claim 1 wherein the peripheral region has a width of between 2 mm and 5 mm.

6. A self-adhesive patch according to claim 1 which is circular and has a diameter of between 70 and 100 mm.

7. A self-adhesive patch according to claim 1 wherein the adhesive backing comprises a high-strength acrylic adhesive and further wherein the adhesive backing has a temperature resistance of at least 82° C. for long periods and at least 121° C. for shorter periods.

8. A self-adhesive patch according to claim 1 wherein the adhesive backing extends to the outermost edge on the reverse side of the patch.

9. A self-adhesive patch according claim 1 wherein the display surface comprises an area of between 27 cm$^2$ and 200 cm$^2$.

10. A method of forming a self-adhesive patch according claim 1 comprising laminating the adhesive backing to the material, debossing the material, and cutting the material to form a patch having a debossed peripheral region.

11. The method of claim 10 wherein the step of laminating the adhesive backing to the material comprises laminating a double sided adhesive tape under tension to the material.

12. The method of claim 10 comprising debossing the material at a temperature of between 100 degrees C. and 220 degrees C.; and applying pressure of 1000 to 4000 psi during debossing.

13. The method of claim 10 comprising debossing for a dwell time of 1-5 seconds using a heat-conducting metal die, which is heated to between 100 degrees C. and 220 degrees C.

14. The method of claim 13 further comprising providing a nylon buffer adjacent to the die, the buffer defining the thickness of the peripheral region of the patch.

15. An item taken from the group consisting of upholstered furniture, luggage and a clothing garment having bonded thereto a self-adhesive patch comprising a display surface on an obverse side, an adhesive backing on a reverse side, a peripheral region from an outermost edge of the patch to a main body region inboard of the peripheral region, wherein the entire peripheral region is thinner than a thickest portion of the main body region.

16. The item of claim 15 wherein the upholstered furniture comprises a seat, the clothing garment comprises a leather jacket, and the luggage comprises a handbag.

17. The item of claim 15 wherein the self-adhesive patch is formed at least in part of a material taken from the group consisting of a natural leather, a bonded leather, a synthetic leather, a fabric and combinations thereof.

18. A method of applying a self-adhesive patch to an item to conceal a region of the item; the patch comprising a display surface on an obverse side, an adhesive backing on a reverse side, a peripheral region from an outermost edge of the patch to a main body region inboard of the peripheral region, wherein the entire peripheral region is thinner than a thickest portion of the main body region; comprising affixing the adhesive backing of the patch to the item wherein the item comprises upholstered furniture, a leather trim of a vehicle, a garment, a leather jacket, luggage, or a handbag.

19. The method of claim 18 wherein the adhesive backing comprises a pressure-sensitive adhesive and the method further comprises pressing the patch onto the item to conceal a defect in the region.

20. The method of claim 18 wherein the self-adhesive patch is formed at least in part of a material taken from the group consisting of a natural leather, a bonded leather, a synthetic leather, a fabric and combinations thereof.

* * * * *